United States Patent [19]

Sauerwein et al.

[11] Patent Number: 4,467,896

[45] Date of Patent: Aug. 28, 1984

[54] LOCKING MECHANISM FOR A ROTARY POWER MACHINE

[75] Inventors: William D. Sauerwein, Westminster; Steve A. Weber, Glyndon; John E. Dibbern, Jr., Street, all of Md.

[73] Assignee: Black & Decker Inc., Newark, Del.

[21] Appl. No.: 505,319

[22] Filed: Jun. 17, 1983

[51] Int. Cl.[3] .......... B62C 7/02

[52] U.S. Cl. .......... 188/69; 192/148

[58] Field of Search .......... 188/69, 68, 31, 60, 188/265, 166; 70/184, 183, 182; 74/527, 530, 813 L, 813 R; 192/71, 148; 173/164

[56] References Cited

U.S. PATENT DOCUMENTS

| | | | |
|---|---|---|---|
| 3,872,951 | 3/1975 | Hastings, Jr. | 188/69 |
| 3,899,852 | 8/1975 | Batson | 74/527 X |

OTHER PUBLICATIONS

A. E. G. Catalogue No. WS 601, Angle Grinder, Jan. 1982.

*Primary Examiner*—Douglas C. Butler
*Attorney, Agent, or Firm*—Ronald B. Sherer; Harold Weinstein; Charles E. Yocum

[57] ABSTRACT

A locking mechanism for a rotary power machine, such as a hand-held power tool, includes a housing-mounted locking pin manually actuatable from a retracted position to an extended, operative position in which the lock pin is received within a pin-receiving bore formed in one of the power transmitting components of the machine. A wedge-like cam or ramp is positioned adjacent to the pin-receiving bore to engage the extended end of the lock pin when the rotating components of the machine are in motion to lift the lock pin away from the pin-receiving bore to prevent accidental engagement of the locking mechanism while machine components are moving. In the preferred embodiment, an output gear is provided with a plurality of ramps and associated pin-receiving bores and is formed as a unitary part using powdered metal fabricating techniques.

11 Claims, 11 Drawing Figures

LOCKING MECHANISM FOR A ROTARY POWER MACHINE

BACKGROUND OF THE INVENTION

1. Field of the Invention

The present invention relates to rotating machinery and, more particularly, to a locking mechanism for selectively locking the components of a rotary machine.

2. Description of the Prior Art

A requirement exists in various types of rotating power machinery, particularly with regard to certain types of hand-held power tools, for selectively locking the power transmitting components of the machine to permit convenient removal and replacement of machine-related parts. For example, in portable electric drills, it is desirable to lock the output spindle to effect convenient removal and replacement of the tool-gripping chuck, and, in hand-held grinder/polishers and similar surface-treating machines, it is desirable to selectively lock the output spindle so that the surface-treating disk (for example, a polishing pad, a sanding disk, or grinding disk) can be readily replaced.

Prior locking devices and mechanisms have typically included a locking pin mounted in the tool housing for limited-stroke movement between a retracted, non-locking position and an extended, locking position. The lock pin is typically urged toward and to its retracted position by a spring and is designed to be manually pushed or depressed so that the inward end of the locking pin enters and engages a pin-receiving bore formed in one of the power transmitting components of the machine. Typically, the pin is mounted in the tool housing adjacent to and for insertion into a bore formed in a shaft, spindle, or gear. These prior locking mechanisms have been generally satisfactory, although they have certain drawbacks. For example, many power tools, such as high-speed pneumatic or electric grinder/polishers, require a coast- or run-down time after supply power is removed so that the moving components will come to a complete stop. Oftentimes, the tool operator will inadvertently depress the locking pin before the rotating power transmitting components have come to a complete stop. The locking pin can enter the pin-receiving bore to cause an unintentionally abrupt locking of the machine. The abrupt lock pin engagement, while the power transmitting components are still in motion, can cause a shock-loading effect that can damage spindles, gears, and bearings. Additionally, as occasionally happens, the lock pin can shear or deform to jam the machine.

In recognition of the above-described problems, safety mechanisms have been developed to prevent unintentional lock pin engagement while the rotary components of a machine are in motion. For example, U.S. Pat. No. 3,872,951, assigned in common herewith, discloses an open loop of spring wire attached to a rotatable machine spindle with the trailing end of the wire loop partially bridging the mouth of a lock pin-receiving bore. The trailing end of the spring wire prevents the lock pin from entering the bore unless a specific sequence of manual steps are performed, which sequence of steps can be performed only after the rotating components of the machine have come to a complete halt. While this safe-locking mechanism fully meets its goals, a cost increment is incurred because of the additional number of piece-parts and additional machining steps required to accommodate the safe-lock mechanism.

In another design, a disk-like member is keyed or splined to the tool output shaft adjacent to the output gear and includes a diametric slot formed on one face for receiving the extended end of a locking pin. Camming surfaces are provided on the axial face between the slots so that the extended end of a locking pin will engage the camming surfaces and be urged toward the retracted position of the tool when the tool components are in motion. As in the case of the spring wire safe-lock mentioned above, the requirement for an additional piece-part in this latter safe-lock mechanism adds a cost increment to the tool and, additionally, limits the lower limit of the tool envelope or "compactness" attainable because the tool housing must now accommodate an additional piece-part mounted on its output shaft.

SUMMARY OF THE INVENTION

In view of the above, it is a primary object of the present invention, among others, to provide a locking mechanism for rotary power machines, particularly hand-held power tools, that is effective to selectively lock the power transmitting components of the machine against rotation.

It is another object of the present invention to provide a locking mechanism for a rotating power tool in which the locking mechanism can be operated reliably and in such a manner that inadvertent locking during tool operation or run-down will be minimized, if not substantially eliminated.

It is a further object of the present invention to provide a locking mechanism for a rotary power tool that can be fabricated at lower cost relative to prior designs utilizing a lower piece-part count and reduced assembly time to thereby reduce the overall cost of tool fabrication.

In accordance with these objects, and others, the present invention provides a locking mechanism for a rotary machine, particularly for a rotary power tool, that includes a lock pin mounted in the tool housing for movement between a retracted position and an extended, locking position in which the lock pin is extended into a pin-receiving bore formed in a power transmitting component of the tool. A wedge-like cam or ramp surface is formed adjacent to the pin-receiving bore in the power transmitting component and has a rising or lifting profile that engages the extended end of the lock pin when the power transmitting components are in motion and forces the lock pin toward its retracted position to prevent the lock pin from entering the pin-receiving bore while the power transmitting components of the tool are in motion.

In the preferred embodiment, a hand-held power tool includes an output gear that is provided with at least one lock pin-receiving bore formed in the gear body parallel to and spaced from the axis of rotation. A lock pin is mounted in the tool housing adjacent to the output gear for controlled movement between a retracted position and an extended, locking position with a spring resiliently biasing the lock pin toward its retracted position. A wedge-like cam or ramp formation is formed on the output gear adjacent to the pin-receiving bore. When the rotating components of the tool, including the output gear, are in motion and the lock pin is depressed toward its extended position, the ramp engages the extended end of the lock pin and lifts it away from the output gear to force the lock pin towards the retracted position to prevent unintentional engagement of the lock pin with its pin-receiving bore. The output gear is formed as a unitary structure utilizing powdered metal techniques.

The locking mechanism in accordance with the present invention advantageously provides a locking arrangement for rotating power machinery, such as portable power tools, that is effective to lock the machine, which will not lock the machine while the rotating components of the machine are in motion, and which is relatively simple to manufacture by utilizing fewer piece-parts and less fabrication and assembly time than prior designs.

BRIEF DESCRIPTION OF THE FIGURES

The above description, as well as the objects, features, and advantages of the present invention will be more fully appreciated by reference to the following detailed description of the presently preferred, but nonetheless illustrative, embodiment in accordance with the present invention taken in conjunction with the accompanying drawing wherein.

DESCRIPTION OF THE PREFERRED EMBODIMENT

Figure 1:
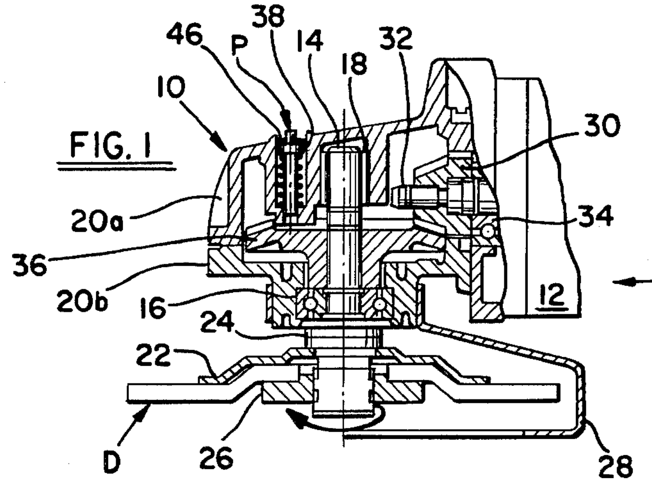
FIG. 1 is a partial, side elevational view, in cross-section, of an exemplary hand-held power tool incorporating the locking mechanism of the present invention.

An exemplary rotary power machine utilizing the lock pin mechanism of the present invention is illustrated in partial cross-section in FIG. 1 in the form of a hand-held grinder/polishing tool for performing surface abrading and polishing operations and is referred to generally therein by the reference character T. The tool T includes a gear head 10 that is powered by an electric motor (not specifically shown) mounted in a body portion 12 of the tool T. The electric motor receives its operating power from an electrical line cord and is selectively actuated by a manually operated switch in the conventional manner.

The gear head assembly 10 includes an output spindle 14 supported for rotation by an anti-friction bearing 16 adjacent to its lower end and a sleeve bearing 18 at its upper end. The bearings 16 and 18 are supported by appropriate counterbores formed in the gear head housing which is defined by mating upper and lower subhousings 20*a* and 20*b*, respectively. The gear head housing may be cast metal or, more preferably, fiber-reinforced plastic. The output spindle 14 is adapted to receive a surface-treating disk D which may take one of several forms including abrasive sanding or grinding disks of various coarseness and compositions as well as polishing-type disks or pads. The surface-treating disk D is mounted on the output spindle 14 and clamped between a backing plate 22 which abutts a collar portion or shoulder 24 of the spindle and a threaded fastener 26. A guard housing 28 masks a selected portion of the disk D to expose an unmasked portion for application to the surface to be worked.

The gear head assembly 10 includes a bevel gear set that transmits power from the electric motor to the surface-treating disk D. The gear set includes a bevel pinion 30 secured to the electric motor shaft 32 by a suitable fastening arrangement (not specifically shown). A bearing 34 (partially shown) provides support for the electric motor shaft 32. A bevel output gear 36 is secured to the output spindle 14, for example, by keying, splining, or other securing means, for rotation with the spindle.

Figure 2B:
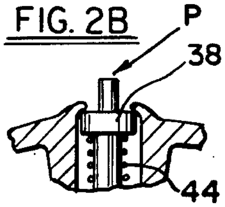
FIG. 2B is a partial, side elevation view, in cross-section, of the lock pin assembly illustrating an alternate structure for retaining the lock pin in place.
Figure 2A:
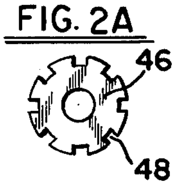
FIG. 2A is a plan view of a "star" type retaining washer used in the embodiment of FIG. 2 to retain the lock pin in place.
Figure 2:
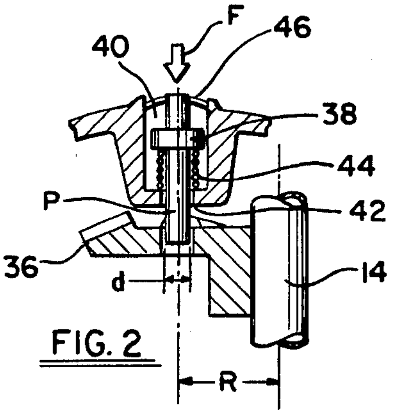
FIG. 2 is a side elevational view, in cross-section, of the output gear of the hand-held power tool of FIG. 1 and cooperating lock pin assembly.

A lock pin mechanism, for selectively locking the output gear 36 and the connected drive components, is positioned above the output gear and includes, as shown in both FIG. 1 and the detail of FIG. 2, an elongated cylindrical pin P having a peripherally-extending collar 38 formed adjacent, but spaced from, its upper end. The lock pin P is received within a cylindrical counterbore 40 formed in the gear head housing. An inwardly-extending lip or rim 42 formed at the lower end of the counterbore 40 defines a clearance bore through which the lower end of the pin P extends. A helical coil spring 44, in compression, is positioned between the lower rim 42 of the counterbore 40 and the collar 38 to resiliantly urge the lock pin P towards an upper, retracted position. The lock pin P is retained within the counterbore 40 by a "star" type spring clip or washer 46 that is press fitted into the counterbore. As shown in FIG. 2A, the "star" clip 46 is generally circular with a concentric clearance hole for the upper extension of the lock pin P and equispaced peripheral slots or recesses 48. The "star" clip 46 is inserted into the counterbore 40 by deforming the peripheral edges downward relative its center portion to reduce its diameter, inserted into the counterbore, and released. The peripheral portions of the released clip 46 then bite into or otherwise engage the side walls of the counterbore 40. Other retaining arrangements can be utilized, including, as shown in FIG. 2B, upsetting or peening over the rim or edge to the counterbore 40. Accordingly, the lock pin P can be manually depressed in the direction of the arrow F to overcome the restoring force of the spring 44.

Figure 3:
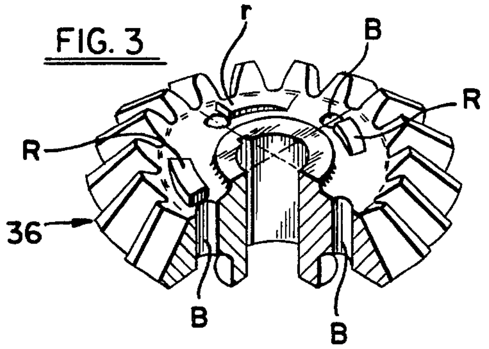
FIG. 3 is an isometric projection of the output gear illustrated in FIGS. 1 and 2 showing a plurality of lock pin-receiving bores and cooperating wedge-like ramps.

As shown in the detail of FIGS. 2 and 3, the output gear 36 has at least one lock pin-receiving bore B formed in the body of the gear at a selected radius "r" from and is aligned substantially parallel to the axis of rotation. The diameter "d" of the pin-receiving bore B is such that the lock pin P can be inserted in and withdrawn from the bore with a selected clearance when the axes of the pin P and the receiving bore B are co-linear and the lock pin is manually depressed to effect insertion and consequent locking of the output gear and the connected components. The radius "r" from the axis of rotation represents the effective moment arm of any torque applied to an engaged lock pin P; a greater radius "r" lessening the force applied to the lock pin and a smaller radius "r" increasing the force.

As shown in FIGS. 2 and 3, the output gear 36 has a wedge-like cam surface or ramp R formed adjacent to each of the lock pin-receiving bores B. The ramps R each have a width that is at least coextensive with the diameter of the associated lock pin bore B and subtend a selected angle about the gear's axis of rotation so as to have a corresponding ramp length, and, lastly, rise above the local face of the gear by a selected height "h". The ramps R are each oriented so that the higher, trailing ends are located adjacent to the lock pin-receiving bores B and trail the lower, leading edges for the direction of rotation selected. The ramp surface is preferably linear at a selected angle of elevation although curvilinear surfaces that effect the desired function, as described below, are suitable.

The output gear 36, the lock pin-receiving bores B, and the associated ramps R are formed as a unitary structure utilizing powdered metal sintering techniques by which metal grannules are compacted in an appropriately sized mold and heated to a temperature sufficient to effect sintering to thereby provide the desired 1-piece part. As can be appreciated, fabrication by powdered metal sintering permits formation of the complete 1-piece gear in a 1-step process with minimal incremental cost for the ramps.

As shown in the sequential views of FIGS. 4A–4E, the ramps R function to prevent unintentional insertion of the lock pin P into the pin-receiving bores B of the output gear 36 and consequent unintentional locking of the power transmitting components while the tool T is running-down or under powered operation. Accidental lock pin insertion, while the parts of the tool are in motion, can damage the tool by subjecting the various components of the tool to undesirably high shock loads which can damage the gears, bearings, spindles, and housing, and cause the lock pin to shear or bend. Also, unintentional locking of an electrically powered tool during application of power can cause an undesirable overcurrent in the motor windings.

Figure 4A:
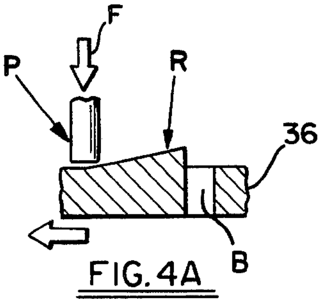
FIGS. 4A, 4B, 4C, 4D and 4E are sequential elevation views of a portion of the output gear of FIGS. 1 and 2 showing the lock pin-receiving bore, the associated wedge-like ramp, and the relative position of the lock pin during attempted locking while the output gear is rotating.
Figure 4B:
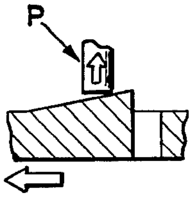
Figure 4C:
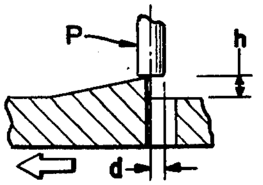
Figure 4D:
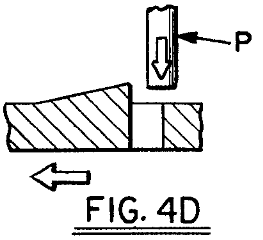
Figure 4E:
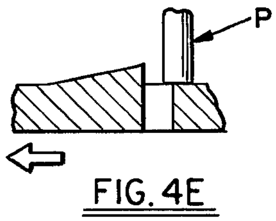

As shown in FIG. 4A, a depressed lock pin P can contact the face of the output gear 36 at or adjacent the lower, leading edge of the ramp R and move up the rising or lifting surface of the ramp as the output gear rotates. As can be appreciated, the transition between the lower, leading edge of the ramp R and the face of the output gear is made as gradual as practicable to prevent unintentional jump. As the output gear 36 continues to rotate, the rising or lifting profile of the ramp R forces the lock pin P in the direction of the arrow shown in FIG. 4B toward its retracted position. As the motion of the output gear 36 continues, the lock pin P is lifted to the full ramp height "h" at which time the lock pin is, in effect, 'launched' or skipped-off the elevated, trailing edge of the ramp R. Depending upon the speed of rotation of the output gear 36, the height "h" and the profile of the ramp surface, and the mass of the lock pin P, the lock pin may continue its movement toward its retracted position after launching from the ramp edge. After the lock pin P separates from the ramp edge and while the output gear 36 continues to rotate, continued application of a lock pin insertion force F will cause the lock pin to reverse the direction of its movement and move toward and again contact the face of the output gear. However, the continued motion of the output gear 36 will cause the lock pin P to contact the output gear out-of-registration with the lock pin-receiving bore B to desirably prevent lock pin insertion while the output gear is in motion. As can be appreciated by those skilled in the art, the launching height "h" of the ramp R and the inertial mass of the lock pin can be readily adjusted so that the kinematics are such that, for all reasonable downward lock pin actuation forces, the lock pin P will be prevented from entering its cooperating pin-receiving bore B above a selected rotational speed. Of course, that selected rotational speed is selected to be low, preferably near zero.

Figure 5:
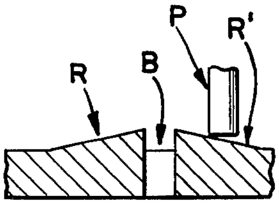
FIG. 5 is an elevational view of a portion of the output gear of FIGS. 4A, 4B, 4C, 4D and 4E illustrating wedge-like ramps on opposite sides of the pin-receiving bore.

The ramp arrangement discussed above and illustrated in FIGS. 1–4E is well-suited for use in rotating power tools and similar machines in which the power transmitting components are driven in a uni-directional manner. For those machines that can be driven bi-directionally, such as reversible electric drills, the twin opposed ramp arrangement of FIG. 5 is suitable. As shown, ramps R and R' are positioned adjacent the pin-receiving bore B with the higher, elevated ends of the ramps R and R' facing one another across the bore entrance. An inadvertently depressed lock pin P, depending upon the direction of rotation of the output gear, will engage one of the ramps, ride up the inclined profile of the ramp, be skipped over the pin-receiving bore, and recontact the gear on the now-declining surface of the other ramp.

The lock pin mechanism has been illustrated in the context of a lock pin that is inserted within a lock pin-receiving bore formed parallel to and at a selected radius from an axis of rotation. As can be well appreciated, the lock pin-receiving bore can be radially aligned in a shaft, spindle, collar, or similar rotating machine part with the associated ramps formed as circumferential members adjacent to the lock pin-receiving bore with the lock pin mounted for reciprocation in a generally radial direction to selectively engage the pin-receiving bore.

The lock pin mechanism of the present invention provides a means by which the power transmitting components of rotating power machines, particularly hand-held power tools, can be conveniently locked from rotation while minimizing or substantially eliminating unintentional locking while the components are in rotation. Additionally, the lock pin mechanism can be fabricated with 1-piece, multi-function parts that can be manufactured using single-step powdered metal techniques.

As can be appreciated by those skilled in the art, various changes and modifications may be effected to the disclosed embodiment of the locking pin mechanism without departing from the spirit and scope of the invention as set forth in the appended claims and their legal equivalent.

What is claimed is:

1. A rotary power tool having a locking mechanism for selectively locking rotatable power transmitting components of the tool, said tool including a source of rotary power and an output spindle contained within a housing, said rotary power tool comprising:

at least one 1-piece rotatable power transmitting component connected between the source of rotary power and the output spindle, said power transmitted component having at least one lock pin-receiving bore therein;

a locking pin means mounted on the tool housing for movement between a retracted, non-locking position and an extended, locking position in which said locking pin is receivable within said lock pin-receiving bore to thereby lock the power transmitting components from motion; and ramp means formed as part of said power transmitting component and positioned adjacent to said lock pin-receiving bore for engagement with an extended lock pin during rotation of said power transmitting component in a first direction and for moving said lock pin toward its non-locking position.

2. The rotary power tool claimed in claim 1 wherein:

said power transmitting component is mounted for rotation about an axis of rotation and said lock pin-receiving bore is formed substantially parallel to the axis of of rotation and spaced therefrom by a selected radius.

3. The rotary power tool claimed in claim 2 wherein said power transmitting component comprises a gear.

4. The rotary power tool claimed in claim 3 wherein said gear comprises a bevel-type gear.

5. The rotary power tool claimed in claim 3 wherein said gear is fabricated by powdered metal techniques.

6. The rotary power tool claimed in claim 1 wherein said lock pin is mounted within a counterbore formed within said tool housing for movement between its retracted, non-locking position and its extended, locking position.

7. The rotary power tool claimed in claim 6 wherein said locking pin includes an enlarged diameter shoulder portion that engages with and slides relative to the cylindrical bore walls; and a peripherally-extendable spring washer retaining said lock pin within said bore.

8. The rotary power tool claimed in claim 6 wherein said lock pin includes an enlarged diameter shoulder portion that engages with and slides relative to the cylindrical bore walls and is retained within said cylindrical bore walls by upset portions of the bore rim.

9. The rotary power tool claimed in claim 1 further comprising:

a second ramp means formed as part of said power transmitting component for engagement with an extended end of a lock pin during rotation of said power transmitting component in a direction opposite said first direction and positioned opposite of said first-mentioned ramp means to also move said lock pin toward its non-locking position.

10. A 1-piece gear for use as a power transmitting component in rotary power machine of the type having a lock pin selectively movable between a retracted, non-locking position and an extended, locking position, said 1-piece gear comprising:

a gear body defined as a body of revolution about an axis of revolution and having a plurality of spaced gear teeth about the periphery thereof;

said gear body having at least one opening therein sized to receive an end of an extended lock pin;

at least one ramp means formed as a unitary structure with said gear body and positioned adjacent said at least one opening for engagement with an end of an extended lock pin when said gear body is in motion about its axis of rotation to move said extended lock pin away from the lock pin-receiving bore.

11. The 1-piece gear claimed in claim 10 wherein said gear is formed as a 1-piece structure from powdered metal granules.

* * * * *